United States Patent
Nelson

[15] 3,698,592
[45] Oct. 17, 1972

[54] FILL PIPE COVER
[72] Inventor: Lowell F. Nelson, Muskegon, Mich.
[73] Assignee: Enterprise Brass Works, Muskegon, Mich.
[22] Filed: Nov. 4, 1970
[21] Appl. No.: 86,669

[52] U.S. Cl....................220/55 Z, 220/55 T, 292/11
[51] Int. Cl..............................................A47j 27/08
[58] Field of Search......220/55 E, 55 G, 55 Y, 55 W, 220/55 Z, 55 T, 55.7, 57, 55 R; 292/256, 11, 259, DIG. 49; 215/86

[56] References Cited

UNITED STATES PATENTS

| | | |
|---|---|---|
| 1,826,609 | 10/1931 | Fitzgerald................220/59 X |
| 2,472,620 | 6/1949 | Rhodes et al.........220/46 P X |
| 2,519,862 | 8/1950 | Verheyden et al..........220/10 |

FOREIGN PATENTS OR APPLICATIONS

| | | |
|---|---|---|
| 285,340 | 6/1915 | Germany...................220/55 Z |
| 521,978 | 6/1940 | Great Britain.............292/256 |
| 461,893 | 2/1951 | Italy........................220/55 W |

*Primary Examiner*—Joseph R. Leclair
*Assistant Examiner*—James R. Garrett
*Attorney*—Barnard, McGlynn & Reising

[57] ABSTRACT

A fill pipe cover having a pair of diametrically opposite pivotal cam levers and an overcenter linkage for manual operation of the levers.

1 Claim, 5 Drawing Figures

PATENTED OCT 17 1972
3,698,592
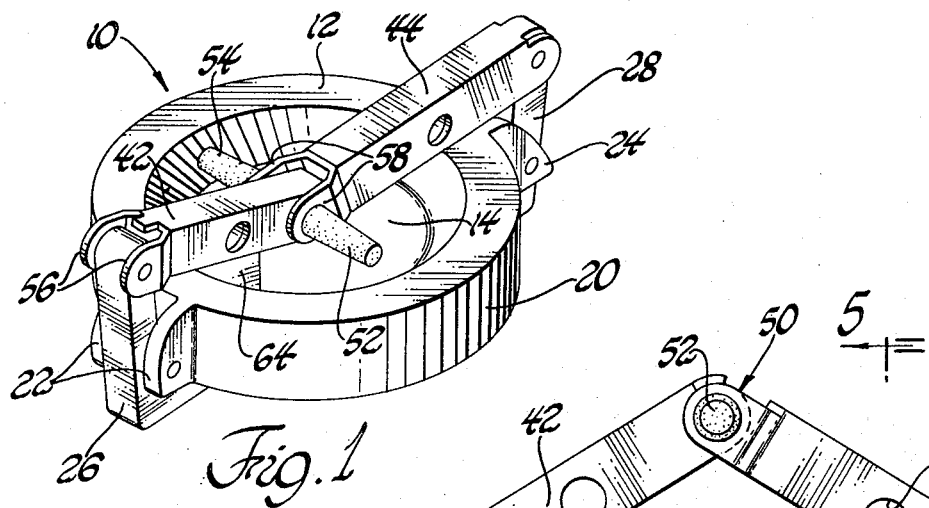
Fig. 1
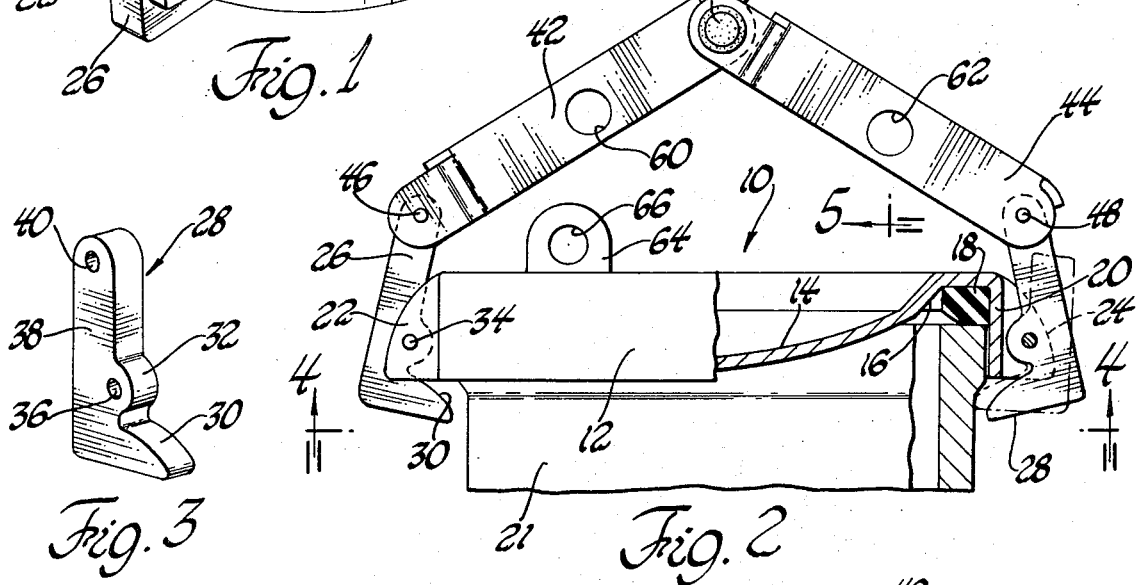
Fig. 3
Fig. 2
Fig. 5
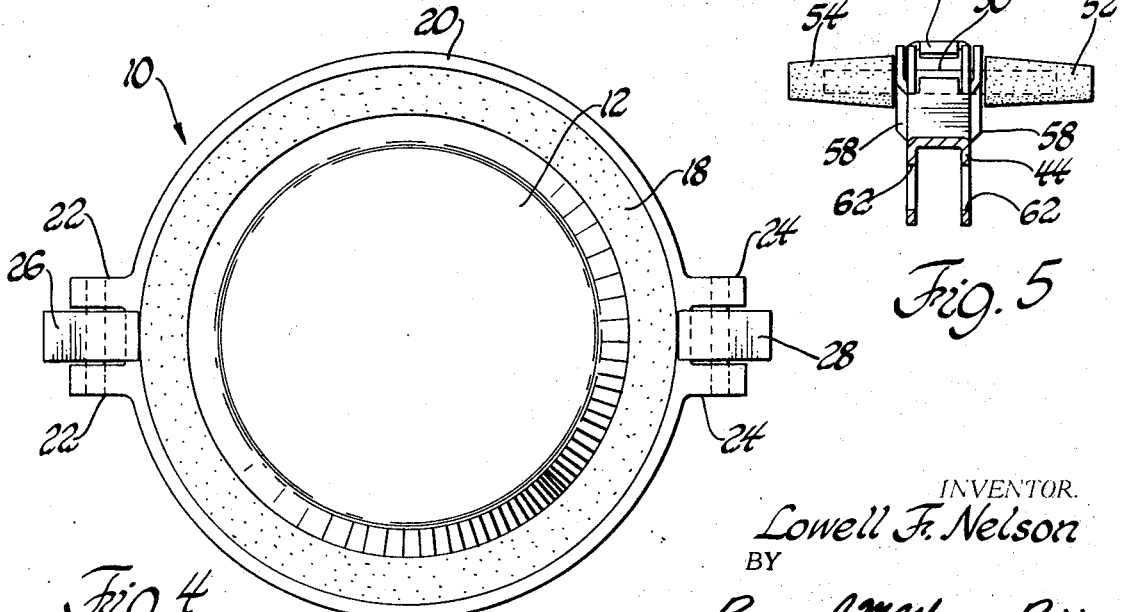
Fig. 4
INVENTOR.
Lowell F. Nelson
BY
Barnard, McGlynn & Reising
ATTORNEYS

FILL PIPE COVER

This invention relates to covers or caps for containers and particularly to covers having a toggle-type linkage for securing the cover to a fill pipe which is associated with the container.

Covers for the fill pipes of liquid storage facilities and the like are often used in extremely adverse environments and, thus, should be rugged, durable, and operationally dependable articles. As an example, a fill pipe cover for a mobile fuel tank or underground storage tank may encounter rough handling as well as corrosive atmospheric conditions. Such a cover must nevertheless remain reliably operational to be easily connected to and removed from the fill pipe as well as to provide the proper seal to prevent the introduction of foreign substances into the tank or the evaporation of the contents of the tank.

Accordingly, the present invention provides a rugged, durable, and operationally dependable cover which is easily attached to and removed from a fill pipe or the like and which in operation provides a good seal between itself and the fill pipe. In general this is accomplished by means of a fill pipe cover which comprises a cover body having mounted thereon a pair of cam levers which operate as simultaneously engageable and disengageable latches to clamp the cover about the annular lip of a fill pipe or the like. The cam levers are operated substantially synchronously by means of a pair of linkage arms which are operatively interconnected at the inner ends thereof to provide a toggle linkage which operates in an over-center fashion.

In accordance with a specific and preferred embodiment of the invention, a fill pipe cover comprises a body which is generally circular in plan view and which is formed with a central depression to define an internal annular recess for engagement with the lip of a fill pipe or the like. A gasket which is radially inwardly beveled is disposed in the recess to mate with the fill pipe lip. In addition, a toggle linkage comprising a pair of diametrically oppositely disposed cam levers and a pair of linkage arms are interconnected in a five point pivotal manner with the cover body such that the central interconnection between the inner ends of the linkage arms may be provided with a handle which permits the interconnection points to be raised and lowered relative to the cover body to move the cam levers between latched and opened positions. Means may be readily provided in such a combination for permitting the use of a lock to maintain one or both of the linkage arms in the lowered position relative to the fill pipe cover body.

Various features and advantages in addition to those briefly set forth above will become apparent upon reading the following specification which sets forth in detail a specific, illustrative, and preferred embodiment of the invention. This specification is to be taken with the accompanying drawings of which:

FIG. 1 is a perspective view of the illustrative embodiment with the toggle linkage in a latched position;

FIG. 2 is a side view partly in cross section of the illustrative embodiment with the toggle linkage in a raised or opened position;

FIG. 3 is a view of a cam lever from the illustrative embodiment;

FIG. 4 is a bottom plan view of the illustrative embodiment; and,

FIG. 5 is a partial plan view of the linkage of the illustrative embodiment.

Referring specifically to the FIGS., a fill pipe cover 10 of the type used to cap and seal fuel storage tanks is shown to comprise an aluminum cover body 12 which is generally circular in plan and which is formed with a relatively deep central depression 14 which gives the fill pipe cover a generally dished-out appearance. The central depression 14 defines, along with an axially aligned peripheral skirt 20, an internal annular recess 16 within which is bonded a resilient gasket 18 having a contact surface which is radially inwardly beveled for engagement with the lip of a fill pipe 21 or the like. The gasket 18 may be fabricated from Buna-N rubber and is bonded into the recess 16 by means of a suitable adhesive such as the adhesive EC1357 which is avaible from the 3–M Company.

Fill pipe cover body 12 has integrally formed thereon first and second pairs of diametrically opposite and substantially radially extending ears or flanges 22 and 24, respectively. As best shown in FIG. 5, each of the ears in the pairs 22 and 24 are spaced apart to receive therebetween sintered brass cam levers 26 and 28, respectively.

The cam levers 26 and 28 are identical and cam lever 28 is, thus, representative as illustrated in FIG. 3. Cam lever 28 is substantially L-shaped in design and is provided with a curving cam surface 30 on the lower leg thereof as well as a rounded projection 32 which receives a pivot pin 34 to pivotally interconnect the cam lever 28 with the ears 24 of the cover body 12. A hole 36 is suitably formed in the cam lever 28 for this purpose. The upright leg 38 of the L-shaped cam lever 28 is provided with a hole 40 for pivotal interconnection of the cam lever with the two linkage arms 42 and 44 of the toggle linkage system best illustrated in FIGS. 1 and 2.

The toggle linkage system which is used to pivot the cam levers 26 and 28 from the latched position of FIG. 1 to the opened position of FIG. 2 includes identical cadmiumplated steel arms 42 and 44 which are preferably formed in a three-sided cross-sectional channel configuration. Linkage arm 42 is pivotally connected at 46 to the upright leg of the cam lever 26 and linkage arm 44 is similarly pivotally connected at 48 to the upright leg 38 of the cam lever 28. The linkage arms 42 and 44 extend diametrically relative to the cover body 12 and are directly pivotally interconnected by means of a pivot 50 at the inner ends thereof as best shown in FIG. 5. Diametrically oppositely extending plastic handles 52 and 54 are provided on pivot 50 so that an operator may easily grasp the toggle linkage and raise it from the lowered and latched condition of FIG. 1 to the raised and opened condition of FIG. 2.

FIG. 1 shows the identical nature of the linkage arms 42 and 44. Linkage arm 42 is provided at the left end as shown in FIG. 1 with a pair of slightly spread fingers 56 which straddle the upper leg of the cam lever 26 and provide for the pivotal interconnection 46. Similarly, linkage arm 44 is provided with a pair of slightly spread fingers 58 which straddle the narrow inner end of the linkage arm 42 to accommodate the pivot 50. The narrow end of linkage arm 44 is pivotally connected at 48 to the cam lever 28. This use of identical linkage arms 42 and 44 in an end-to-end configuration permits an advantage in manufacturing efficiency. Holes 60 and 62 are formed in identical locations on the linkage arms 42 and 44, the hole 60 cooperating with a hole 66 in an upstanding lock bar 64 which is integral with the cover body 12 for locking purposes. When the linkage arm 42 is in the lowered latched position of FIG. 1, the holes 60 and 66 are in alignment, thus, permitting the introduction of a padlock ring as is believed to be clear from the views of FIGS. 1 and 2.

Referring to FIG. 5, the specific construction of the interconnection at the inner ends of the linkage arms 42 and 44 is shown in detail. It can be seen that the pin 50 extends commonly through the narrow channel area of the linkage arm 42 as well as the spread fingers 58 of the linkage arm 44. Plastic handles 52 and 54 of a frusto conical configuration are friction fit over the ends of the pin 50 to provide for manual operation of this direct interconnect toggle linkage.

In operation, the five point pivotal linkage which comprises the cam levers 26 and 28 and the linkage arms 42 and 44 is self-centering when urged toward the latched condition since the cam surfaces of the cam levers 26 and 28 engage the typically annular lip of fill pipe 21 and exert equal and opposite reaction forces thereon. The fill pipe cover 10 is easily latched on the end of the fill pipe simply by depressing the centrally located inner ends of the linkage arms 42 and 44 until the toggle linkage passes over center and assumes the lowered latched condition illustrated in FIG. 1. The linkage may be locked in place in this condition as previously described.

When the fill pipe cover 10 is latched in engagement with the fill pipe lip, the beveled gasket 18 seats securely on the pipe lip, the beveled contact surface ensuring a good seal even though the lip of the fill pipe might be moderately damaged and deformed. The bevel is slightly compressed as seen in FIG. 2 and normally extends to the radially outer surface.

When it comes time to remove the cover 10 from the fill pipe, the operator simply grasps the handles 52 and 54 and raises them directly upwardly; i.e., axially away from the fill pipe cover body 12 until the arms 42 and 44 of the toggle linkage pass well over center and assume the unlatched or opened condition illustrated in FIG. 2. It is apparent that raising the center of the toggle linkage shortens the diametric length of the arms causing the L-shaped cam levers to move inwardly at the upper ends of the upright legs as seen in FIG. 2. This obviously tends to spread the lower legs of the cam levers 26 and 28 to permit the cover 10 to be removed over the annular lip of the fill pipe. The absence of any close tolerance sliding elements in the toggle linkage and the dependence on a self-centering action affords advantageous simplification of manufacture and design and further affords reliability of operation in that there is a substantially decreased opportunity for resistance to latching or unlatching movements due to corrosion or other short-term fusion between elements.

It is to be understood that the foregoing description is illustrative in nature and is not to be construed in a limiting sense.

The embodiments of the invention in which an exclusive property or privilege is claimed are defined as follows:

1. A fill pipe cover for a fill pipe having a radially outwardly projecting flange about its filling end comprising: a cover body having an annular recess axially opening to receive said fill pipe flange and a peripheral skirt portion to surround the outer periphery of said pipe flange, first and second cam levers pivotally mounted on opposite sides of the body for securing the body to the end of a fill pipe; and a pair of substantially rigid linkage arms pivotally connected to the cam levers and to each other such that raising the arms relative to the body opens the levers relative to a fill pipe and lowering the levers closes the levers about the fill pipe, a gasket in said annular recess for engagement with the top of said fill pipe flange, each of said cam levers being substantially L-shaped and defining on the lower portion thereof a curving cam surface for engagement with the fill pipe flange during securement of the cover to the pipe, each of said linkage arms being identical to the other and comprising a open channel having spread fingers at one end and unspread fingers at the other, the arms being joined with the spread fingers of one arm pivotally connected to the unspread fingers of the other arm and with the spread fingers of said one arm pivotally connected to and around the upper end of one of said cam levers and the unspread fingers of said other arm pivotally connected to and around the upper end of the other of said cam levers, the pivotal connection between the linkage arms being substantially central of the cover body such that the combination of the linkage arms extends diametrically across the body to form a five point pivotal interconnection between the cam levers and the linkage arms, said connection comprising a pin extending commonly and laterally through the fingers of the arm and supporting laterally-extending handle portions thereon, the cover body being concave to define a recess into which the pivotal connection between the linkage arms is disposed when the fill pipe cover is latched on the fill pipe by means of the cam levers, the arms being of such length as to operate in an overcenter latching fashion when lowered relative to the cover body.

* * * * *